Figure 1:
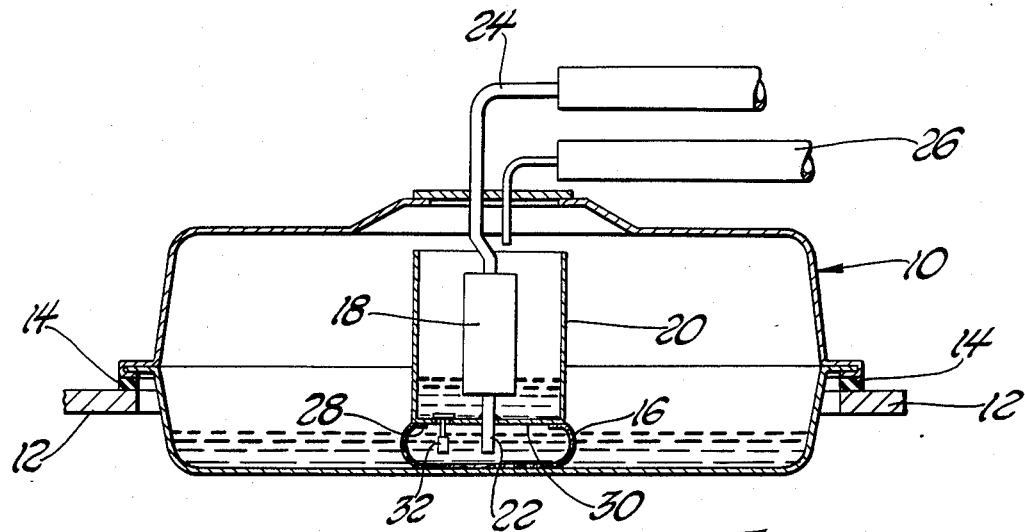

United States Patent [19]

Brunell et al.

[11] Patent Number: 4,546,750
[45] Date of Patent: Oct. 15, 1985

[54] SECONDARY RESERVOIR FOR A FUEL TANK

[75] Inventors: Jack W. Brunell, Byron; Robert W. Stein, East Lansing, both of Mich.

[73] Assignee: General Motors Corporation, Detroit, Mich.

[21] Appl. No.: 630,260

[22] Filed: Jul. 12, 1984

[51] Int. Cl.⁴ .............................................. F02M 39/00
[52] U.S. Cl. .................................. 123/514; 123/509; 137/571; 137/576; 137/579
[58] Field of Search ............... 123/514, 509, 516, 517; 137/568, 571, 572, 575, 576, 577, 578, 579, 585

[56] References Cited

U.S. PATENT DOCUMENTS

| | | | |
|---|---|---|---|
| 1,189,096 | 6/1916 | Grunwald | 123/514 |
| 2,945,509 | 7/1960 | Tuttle | 137/576 |
| 3,079,944 | 3/1963 | McLaughlin | 137/579 |
| 3,490,482 | 1/1970 | Sachs | 137/572 |
| 3,534,721 | 10/1970 | King | 123/517 |
| 3,726,310 | 4/1973 | Coscia | 137/576 |
| 3,960,174 | 6/1976 | Latimer | 137/571 |
| 4,279,232 | 7/1981 | Schuster | 123/514 |
| 4,397,333 | 8/1983 | Liba | 123/514 |

FOREIGN PATENT DOCUMENTS

| | | | |
|---|---|---|---|
| 2460101 | 6/1976 | Fed. Rep. of Germany | 123/514 |
| 2651459 | 5/1977 | Fed. Rep. of Germany | 123/516 |
| 2844053 | 4/1980 | Fed. Rep. of Germany | 123/509 |

*Primary Examiner*—Carl Stuart Miller
*Attorney, Agent, or Firm*—Donald F. Scherer

[57] ABSTRACT

A vehicle fuel tank has a filter and a secondary reservoir disposed above the filter. An intank fuel pump is situated within the secondary reservoir and draws fuel from the interior of the filter. An inertia responsive valve controls fuel communication between the secondary reservoir and the interior of the filter. The valve opens when the vehicle undergoes acceleration to allow fuel in the secondary reservoir to enter the filter interior. The secondary reservoir is filled by a fuel return line from the vehicle engine.

2 Claims, 2 Drawing Figures

SECONDARY RESERVOIR FOR A FUEL TANK

This invention relates to vehicle fuel tanks and more particularly to vehicle fuel tanks having a secondary reservoir disposed therein.

Prior art fuel tanks, which use secondary reservoirs to ensure continuous fuel feed to the engine during acceleration of the vehicle, connect the secondary reservoir directly to the fuel pump inlet line and continuously open thereto. If the fuel filter in the inlet line should be restrictive or the fuel level in the fuel tank should be low, the fuel feed may not respond as desired during some accelerations of the vehicle.

The present invention overcomes this situation by communicating fuel from the secondary reservoir to the pump inlet line at the interior of the filter. Also, in this invention, the secondary reservoir is open to the pump inlet only during vehicle accelerations or operation in hilly terrain. This is accomplished by placing an inertia responsive valve between the secondary reservoir and the interior of the fuel filter.

It is therefore an object of this invention to provide an improved vehicle fuel tank wherein a secondary reservoir is disposed above the intank fuel filter and is controlled to communicate fuel to the interior of the filter during vehicle acceleration.

It is another object of this invention to provide in an improved vehicle fuel tank, a secondary reservoir which is displaced vertically from the intank fuel filter and has an outlet controlled by an inertia responsive valve to supply fuel to the fuel pump inlet, in bypassing relation with the filter, during vehicle acceleration.

Figure 2:
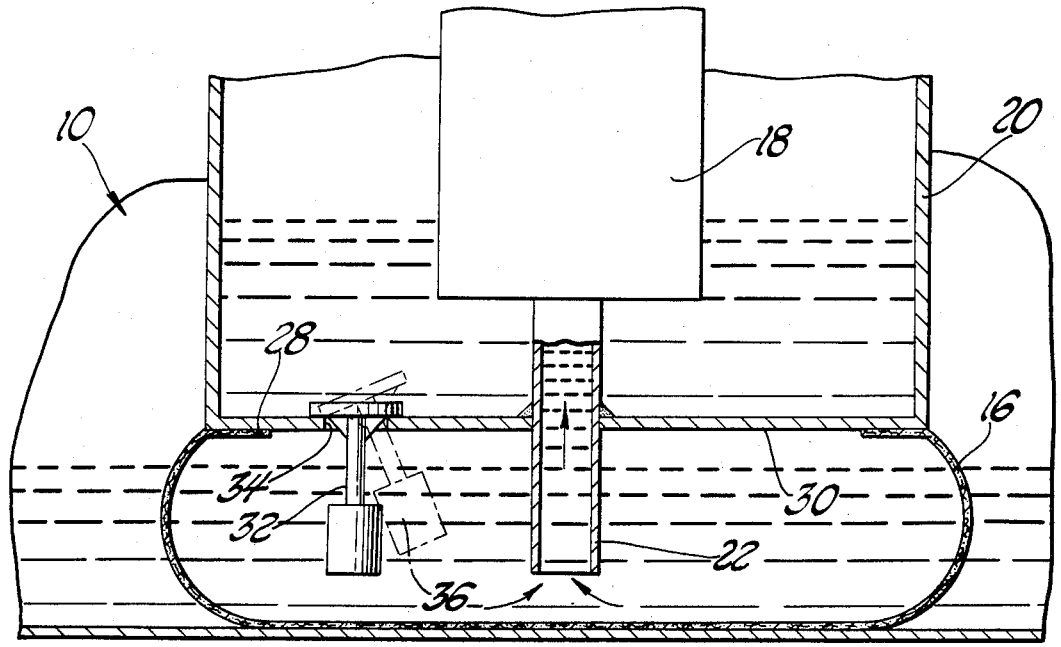

These and other objects and advantages of the present invention will be more apparent from the following description and drawings in which:

FIG. 1 is a diagrammatic representation of a vehicle fuel tank incorporating the present invention; and FIG. 2 is an enlarged portion of FIG. 1 showing the inertia valve in operation.

Referring now to the drawings, wherein like characters represent the same or corresponding parts throughout the several views, there is seen in FIG. 1 a vehicle fuel tank or reservoir 10 resiliently supported on a vehicle frame 12 by elastomeric pads 14. This support is shown diagrammatically only and any of the well-known fuel tank supporting mechanisms can be utilized.

Disposed within the fuel tank 10 is a fuel filter 16, a fuel pump 18 and a secondary reservoir 20. The fuel pump 18 is a conventional intank or submerged type pump having a fuel inlet pipe 22 extending into the interior of the fuel filter 16. The fuel pump 18 delivers fuel through a fuel feed pipe 24 which is connected with a conventional vehicle engine, not shown. Since the fuel pump 18 will generally supply more fuel than required by the engine, a fuel return pipe is connected to the upper surface of the fuel tank. This return pipe 26 deposits fuel into the interior of the secondary reservoir 20.

As best seen in FIG. 2, the secondary reservoir 20 is disposed immediately adjacent the upper surface 28 of the fuel filter 16. The lower surface 30, of the secondary reservoir 20, has disposed therein an inertia responsive valve 32 which is operable, in its normal position, to close an aperture 34 formed in the surface 30. When the aperture 34 is opened, fuel from the secondary reservoir 20 can flow through the the valve 32 to the interior of the filter 16 and directly to the pump fuel inlet pipe 22. One open position of valve 32 is shown in phantom line 36 in FIG. 2 while the closed position is shown in solid lines in FIG. 2.

Since the fuel returned from the engine, via return pipe 26, has been filtered, there is no likelihood of contaminated fuel being directly admitted to the fuel inlet pipe. Thus, the return fuel can be deposited directly into the secondary reservoir 20. The upper end of the secondary reservoir 20 is open such that excess fuel delivered thereto will discharge into the fuel tank 10.

During operation, the vehicle can undergo various types of acceleration or operate in an uphill attitude whereby the general fuel level in the fuel tank 10 will be affected due to fluid inertia or gravity. During such operating conditions, if the general fuel level is low, the fuel inlet pipe might ingest some air. However, during such operating conditions with the present invention, the inertia valve 32 will move to an open position so that the fuel in the secondary reservoir 20 will flow into the interior of the filter 16 and substantially directly into the inlet pipe 22, thus preventing air ingestion or pump cavitation. While pump cavitation or air ingestion is not physically detrimental to the vehicle, it may cause some faltering in performance similar to that which occurs when the vehicle is out of fuel. These periods of operation, i.e., acceleration or hill climbing are short-lived. The likelihood of all the fuel from the secondary reservoir 20 being drained during any individual maneuver is very remote.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in fuel reservoirs having a submerged pump member which draws fluid from the interior of a filter and delivers the fluid to an engine and wherein a fuel return line from the engine dispenses excess fuel into a fuel tank having a floor wherein the improvement comprises; a secondary reservoir surrounding the fuel pump and being located to receive the return fuel from the engine and displaced vertically from the floor; and an inertia responsive valve means operatively connected between the secondary reservoir and the interior of the filter for permitting fuel in said secondary reservoir to enter the interior of the filter and the pump inlet when the vehicle carrying the fuel tank undergoes acceleration.

2. An improvement in fuel reservoirs having a submerged pump member which draws fluid from the interior of a filter and delivers the fluid to an engine and wherein a fuel return line from the engine dispenses excess fuel into a fuel tank having a floor wherein the improvement comprises; a secondary reservoir surrounding the fuel pump and being located to receive the return fuel from the engine and displaced vertically from the floor including a lower surface portion adjacent the upper edge of the filter, and an aperture in said surface; and an inertia responsive valve means disposed in said lower surface and being operative to control the opening of said aperture for providing fluid communication between the secondary reservoir and the interior of the filter for permitting fuel in said secondary reservoir to enter the interior of the filter and the pump inlet when the vehicle carrying the fuel tank undergoes acceleration.

* * * * *